United States Patent
Ryu et al.

(10) Patent No.: US 8,307,162 B2
(45) Date of Patent: Nov. 6, 2012

(54) METHOD AND APPARATUS FOR CACHE FLUSH CONTROL AND WRITE RE-ORDERING IN A DATA STORAGE SYSTEM

(75) Inventors: In-sik Ryu, Suwon-si (KR); Sang-hoon Lee, Suwon-si (KR); Se-wook Na, Suwon-si (KR); Hye-jeong Nam, Seongnam-si (KR)

(73) Assignee: Seagate Technology LLC, Cupertino, CA (US)

( * ) Notice: Subject to any disclaimer, the term of this patent is extended or adjusted under 35 U.S.C. 154(b) by 546 days.

(21) Appl. No.: 12/499,835

(22) Filed: Jul. 9, 2009

(65) Prior Publication Data

US 2010/0011168 A1     Jan. 14, 2010

(30) Foreign Application Priority Data

Jul. 11, 2008 (KR) ................. 10-2008-0067818

(51) Int. Cl.
 *G06F 13/00* (2006.01)
(52) U.S. Cl. .................... 711/135; 711/113; 711/100
(58) Field of Classification Search .................. 711/103, 711/113, 118, 135, 162, E12.001, E12.022
See application file for complete search history.

(56) References Cited

U.S. PATENT DOCUMENTS

| | | | |
|---|---|---|---|
| 7,340,580 B2 * | 3/2008 | Kinoshita | 711/173 |
| 7,525,745 B2 * | 4/2009 | Nitta | 360/31 |
| 2003/0084252 A1 * | 5/2003 | Talagala | 711/135 |
| 2009/0193182 A1 * | 7/2009 | Nitta | 711/103 |

* cited by examiner

*Primary Examiner* — Matthew Bradley
*Assistant Examiner* — Zhuo Li
(74) *Attorney, Agent, or Firm* — David K. Lucente

(57) ABSTRACT

Methods and apparatus for cache flush control and write re-ordering in a data storage system are provided. A cache flush control method includes cache flushing information stored in a cache memory to a first storage apparatus of a plurality of storage apparatuses included in a data storage system when a cache flush condition is generated, and performing a write command in a second storage apparatus of the plurality of storage apparatuses which has a write speed lower than the first storage apparatus according to information stored in the first storage apparatus processed with the cache flush.

20 Claims, 13 Drawing Sheets

METHOD AND APPARATUS FOR CACHE FLUSH CONTROL AND WRITE RE-ORDERING IN A DATA STORAGE SYSTEM

CROSS-REFERENCE TO RELATED APPLICATIONS

This application claims priority under 35 U.S.C. §119(a) from Korean Patent Application No. 10-2008-0067818, filed on Jul. 11, 2008 in the Korean Intellectual Property Office, the disclosure of which is incorporated herein in its entirety by reference.

BACKGROUND

1. Field of the Invention

The present general inventive concept relates to methods and apparatus for cache flush control, and, more particularly, relates to methods and apparatus for cache flush control and write re-ordering in a data storage system.

2. Description of the Related Art

A conventional hard disk drive is usable as a data storage apparatus in a computer operating system to read data from a disk using a magnetic head and to write data on the disk.

The conventional hard disk drive typically has a storage capacity larger than a semiconductor memory. However, the conventional hard disk drive has a data access and transmission speed lower than the semiconductor memory. In an effort to solve this problem, a cache memory can be used to compensate for the lower speed.

However, since the cache memory is directly controlled by the hard disk drive, it is difficult to improve the speed of the cache memory corresponding to the hard disk drive.

SUMMARY

Accordingly, the present general inventive concept provides methods and apparatus for cache flush control, and, more particularly, provides methods and apparatus for cache flush control and write re-ordering in a data storage system.

Additional aspects and utilities of the present general inventive concept will be set forth in part in the description which follows and, in part, will be obvious from the description, or may be learned by practice of the general inventive concept.

The foregoing aspects and advantages of the present general inventive concept may be achieved by providing a cache flush control method, including, among other things, a cache flushing information stored in a cache memory to a first storage apparatus of a plurality of storage apparatuses included in a data storage system when a cache flush condition is generated, and performing a write command in a second storage apparatus of the plurality of storage apparatuses which has a write speed lower than the first storage apparatus according to information stored in the first storage apparatus processed with the cache flush.

The cache flush control method may include where the plurality of storage apparatuses comprise a non-volatile storage apparatus.

The cache flush control method may include where the first storage apparatus comprises a non-volatile storage apparatus having a writing speed higher than other storage apparatuses included in the data storage system.

The cache flush control method may include the first storage apparatus comprises a non-volatile semiconductor memory apparatus.

The cache flush control method may include the second storage apparatus comprises a hard disk drive.

The cache flush control method may include the information comprises a command queue and data to be recorded.

The cache flush control method may further include generating a table to represent rearrangement of an order of a plurality of commands included in a command queue of the information such that the order to perform the commands of the command queue is rearranged according to physical location on logical block addresses so as to shorten a period of time taken to perform the commands, and performing the write commands on the second storage apparatus by reading data from the first storage apparatus according to the rearranged order of the commands in the generated table.

The cache flush control method may include where the rearranged order of the commands included in the command queue to be performed is corresponds to a direction in which the commands are sequentially performed on a storage medium in the direction.

The cache flush control method may include where the storage medium comprises a disk.

The cache flush control method may include, where the table is stored in the first storage apparatus.

The foregoing aspects and advantages of the present general inventive concept may also be achieved by providing a computer-readable medium to contain computer-readable codes, that, when executed by a computer, perform a cache flush control method of a data storage system, the method including, among other things, cache flushing information stored in a cache memory to a first storage apparatus of a plurality of storage apparatuses included in a data storage system when a cache flush condition is generated, and performing a write command in a second storage apparatus of the plurality of storage apparatuses which has a write speed lower than the first storage apparatus according to information stored in the first storage apparatus processed with the cache flush.

The foregoing aspects and advantages of the present general inventive concept may also be achieved by providing a data storage system, including, among other things, a plurality of storage apparatuses having different data writing methods, a cache memory to temporarily store information read from or to be stored in the plurality of storage apparatuses, and a controller to cache flush information stored in a cache memory to a first storage apparatus of the plurality of storage apparatuses included in the data storage system when a cache flush condition is generated, and to perform a write command in a second storage apparatus of the plurality of storage apparatuses which has a write speed lower than the first storage apparatus according to information stored in the first storage apparatus processed with the cache flush.

The data storage system may include where the plurality of storage apparatuses comprise a non-volatile storage apparatus.

The data storage system may include where the first storage apparatus comprises a non-volatile storage apparatus having a writing speed higher than other storage apparatuses included in the data storage system.

The data storage system may include where the first storage apparatus comprises a non-volatile semiconductor memory apparatus.

The data storage system may include where the second storage apparatus comprises a hard disk drive.

The data storage system may include where the information comprises a command queue and data to be recorded.

The data storage system may include where the controller generates a table to represent rearrangement of an order of a plurality of commands included in a command queue of the information such that the order to perform the commands of the command queue is rearranged according to physical location on logical block addresses so as to shorten a period of time taken to perform the commands.

The data storage system may include where the controller stores information on the table in the first storage apparatus.

The data storage system may include where the controller performs a write command in a second storage apparatus by reading data stored in the first storage apparatus according to the rearranged order of the commands in the generated table.

The data storage system may include where the rearranged order of the commands included in the command queue to be performed corresponds to a direction in which the commands are sequentially performed on a storage medium in the direction.

The data storage system may include where wherein the storage medium comprises a disk.

The foregoing aspects and advantages of the present general inventive concept may also be achieved by providing a method of controlling data storage, including, among other things, storing one or more commands and data in a memory, upon detecting a predetermined condition, writing the one or more commands and the data stored in the memory to a first data storage device, detecting an availability of a second data storage device, and controlling a write operation of at least the data stored on the first storage device to the second data storage device.

The foregoing aspects and advantages of the present general inventive concept may also be achieved by providing a method of controlling data storage, including, among other things, storing one or more received commands and data in a memory, upon detecting a predetermined condition, writing the one or more commands and the data stored in the memory to a first data storage device, re-ordering the one or more commands stored in the first data storage device for a sequential write operation, and with the one or more re-ordered commands, controlling the sequential write operation of the data stored on the first data storage device to a second data storage device.

The foregoing aspects and advantages of the present general inventive concept may also be achieved by providing a method of controlling data storage, including among other things, storing one or more received commands and data to a cache memory of a storage system, upon determining a cache flush condition has been met, controlling a write operation of the one or more received commands and the data in the cache memory to a first memory device, generating a re-ordered command table with the one or more stored commands in the first storage device for a sequential write operation, and controlling the sequential write operation of the data from the first data storage device to a second data storage device using the re-ordered command table.

The foregoing aspects and advantages of the present general inventive concept may also be achieved by providing a data storage system, including, among other things, a first data storage device having a first data storage capacity and a first operation response time, a second data storage device having a second data storage capacity and a second operation response time, where the second data storage capacity is greater than the first data storage capacity and the second operation response time is greater than the first operation response time, a memory to store one or more commands and data received from a host computer interface, and a controller to control a write operation of the one or more commands and the data stored in the memory to the first data storage device, and to control a write operation from the first data storage device to the second data storage device.

The foregoing aspects and advantages of the present general inventive concept may also be achieved by providing a data storage system, including, among other things, a first data storage device having a first data storage capacity and a first operation response time, a second data storage device having a second data storage capacity and a second operation response time, where the second data storage capacity is greater than the first data storage capacity and the second operation response time is greater than the first operation response time, a cache memory to store one or more commands and data received from a host computer interface, and a controller to control a write operation of the one or more commands and the data stored in the memory to the first data storage device, and to control a sequential write operation of the data from the first data storage device to a second data storage device with the one or more commands that are re-ordered.

The foregoing aspects and advantages of the present general inventive concept may also be achieved by providing a non-volatile memory including, among other things, a first memory area to store command queues and data to correspond to the command queues, and a second memory area to store a reordering table, and to reorder the command queues according to the stored recording table such that the data is transmitted according to the reordered command queues.

The non-volatile memory may include where the first memory area receives the command queues and data at a first rate, and sends out the reordered data at a second rate.

The foregoing aspects and advantages of the present general inventive concept may also be achieved by providing a data storage system, including, among other things, a cache memory to receive command queues and data from an external device, and a non-volatile memory including a first memory area to receive the command queues and data from the cache memory and to store the command queues and data to correspond to the command queues, and a second memory area to store a reordering table and to reorder the command queues according to the stored recording table such that the data is transmitted according to the reordered command queues.

The data storage system may further include, among other things, a hard disk drive to receive the reordered data and to store the received data.

The foregoing aspects and advantages of the present general inventive concept may also be achieved by providing a computer system including, among other things, a processor to output command queues and data from an external device, a cache memory to receive command queues and data from an external device, and a non-volatile memory including a first memory area to receive the command queues and data from the cache memory and to store the command queues and data to correspond to the command queues, and a second memory area to store a reordering table and to reorder the command queues according to the stored recording table such that the data is transmitted according to the reordered command queues.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
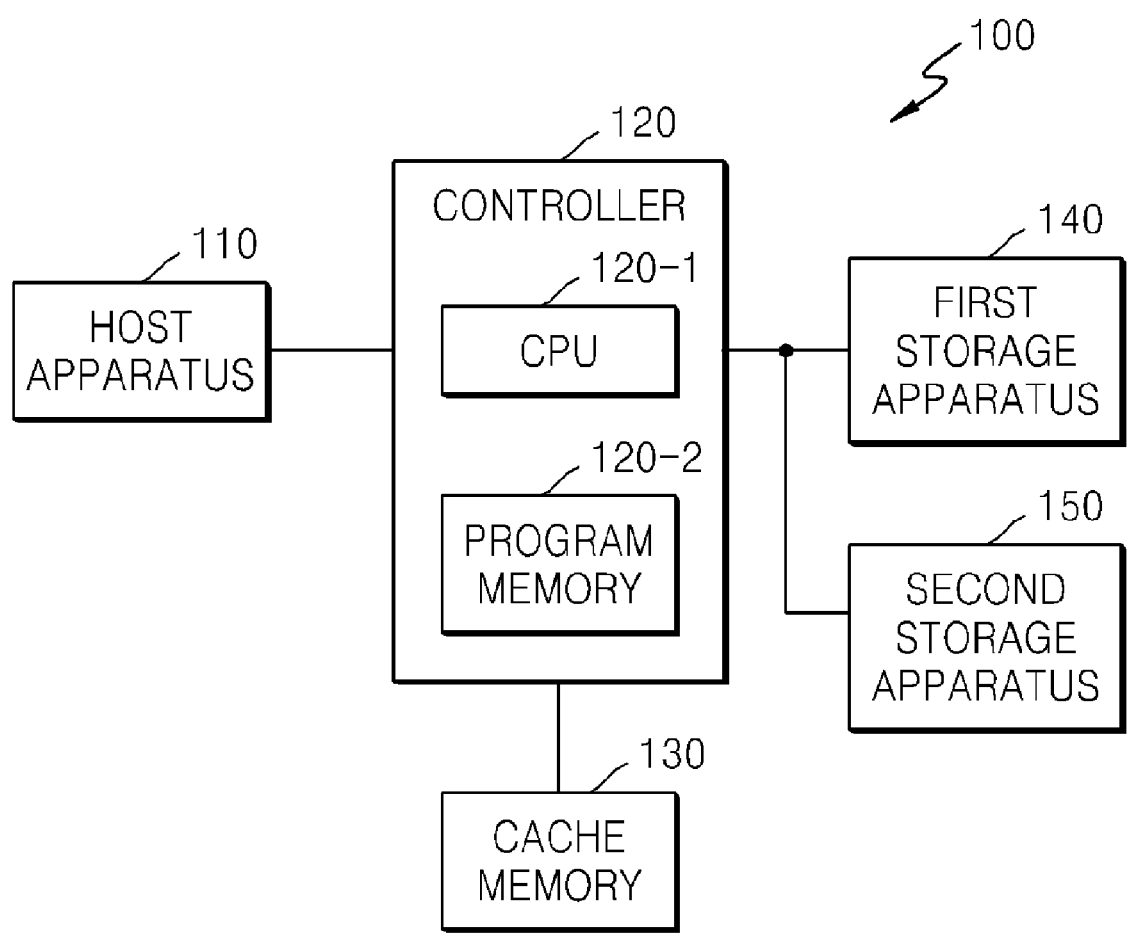
FIG. 1 illustrates a data storage system according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 illustrates a data storage system 100.

The data storage system 100 includes a host apparatus 110, a controller 120, a cache memory 130, a first storage apparatus 140, and a second storage apparatus 150. The host apparatus 110 may be, for example, a computer, a server, a computing system, or any other suitable device.

The controller 120 includes a central processing unit (CPU) 120-1 and a memory 120-2. The CPU 120-1 of the controller 120 controls operations of the data storage system 100 or a control unit to perform analysis of a command and a series of processing, calculating, comparing, etc., of data usable in a computer system or in the data storage system 100. The memory 120-2 stores programs and/or data to control the data storage system and/or program or data to perform a method 400 illustrated in FIG. 4.

The first storage apparatus 140 and the second storage apparatus 150 may be a nonvolatile memory which can store data stored therein when power is turned off and power is when not supplied to the memory. The first storage apparatus 140 and the second storage apparatus 150 may have different data writing or reading methods of writing and reading data. According to an embodiment of the present general inventive concept, the first storage apparatus 140 may be referred to as a storage apparatus having a larger data storing capacity and/or a slower data writing or reading speed than the second storage apparatus 150. The second storage apparatus 150 may be referred to as a storage apparatus having a lower data storing capacity and/or a higher data writing or reading speed than the first storage apparatus 140. For example, the first storage apparatus 140 may be implemented as a hard disk drive apparatus, and the second storage apparatus 150 may be implemented as a non-volatile semiconductor memory apparatus (nonvolatile memory apparatus). Although FIG. 1 illustrates the data storage system 100 including two storage apparatuses, the present general inventive concept is not limited thereto. It is possible that more than two storage apparatuses can be used in the data storage system 100. If three storage apparatuses are used or included in the data storage system, the first storage apparatus can be used as a cache memory, and a nonvolatile memory having a writing speed higher than other storage apparatuses can be used as the cache memory.

The cache memory 130 temporarily stores a received command, information to be written in at least one of the storage apparatuses (e.g., first storage apparatus 140, second storage apparatus 150, etc.), and/or information read from one or more storage apparatuses.

A method of controlling a cache flush according to an embodiment of the present general will be described with reference to FIGS. 4 and 5.

Figure 5:
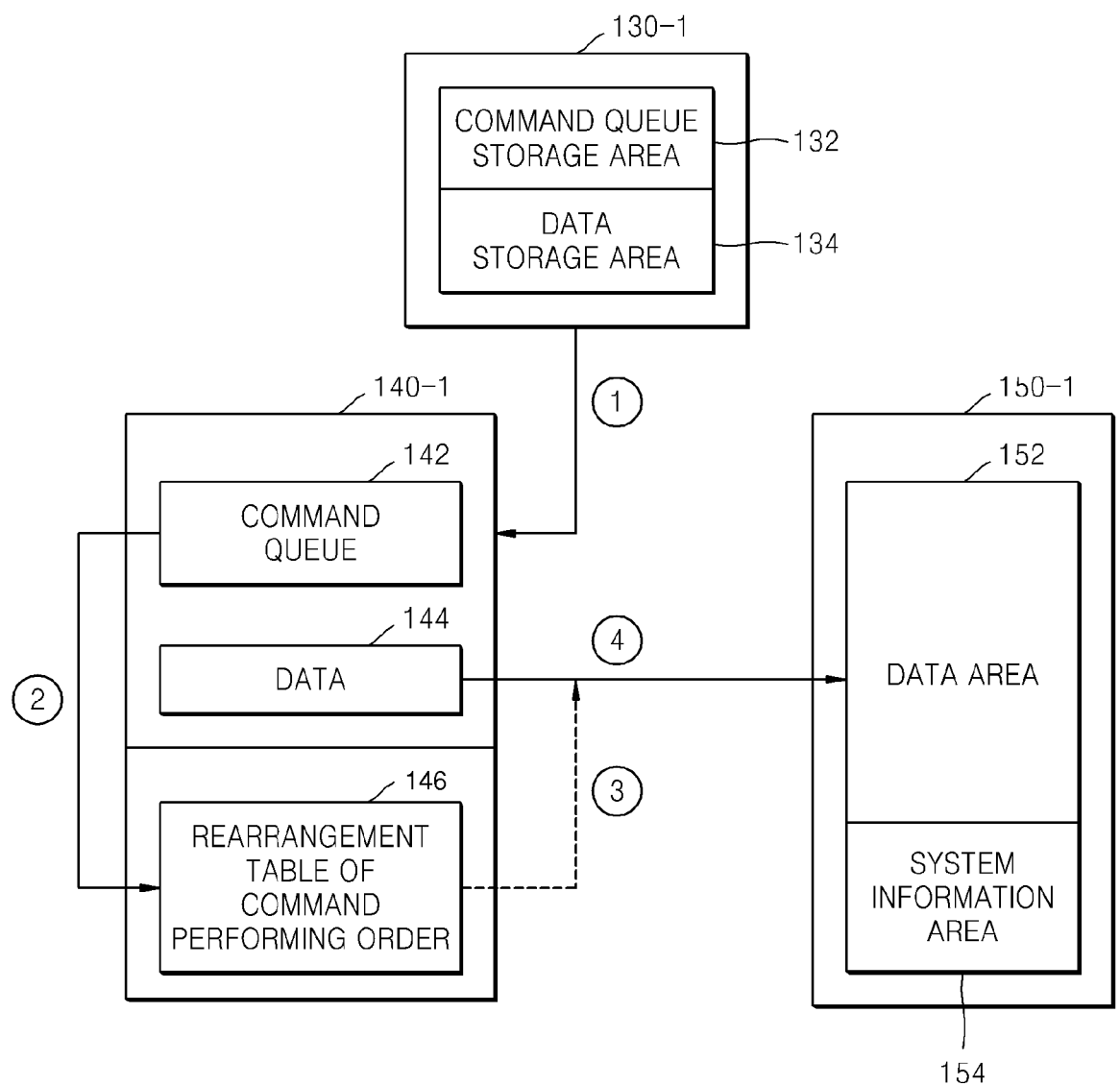
FIG. 5 is a block diagram illustrating a transmission of information between storage apparatuses according to an embodiment of the present general inventive concept.

FIG. 5 illustrates a state of transmitting information between storage apparatuses. A reference 130-1 represents a writing area (a writing medium) of the cache memory. A reference 140-1 represents a storing area (storing medium) of a first storage apparatus, and a reference 150-1 represents a storing area (storing medium) of the second storage apparatus. The storing medium 140-1 of the first storage apparatus stores a command queue 142 and data 144 to be recorded in an auxiliary cache area according to the cache flush. The storing medium 140-1 also includes a rearrangement table of command performing order 146. The storing medium 150-1 of the second storage apparatus includes a data area 152 and a system information area 154.

Figure 4:
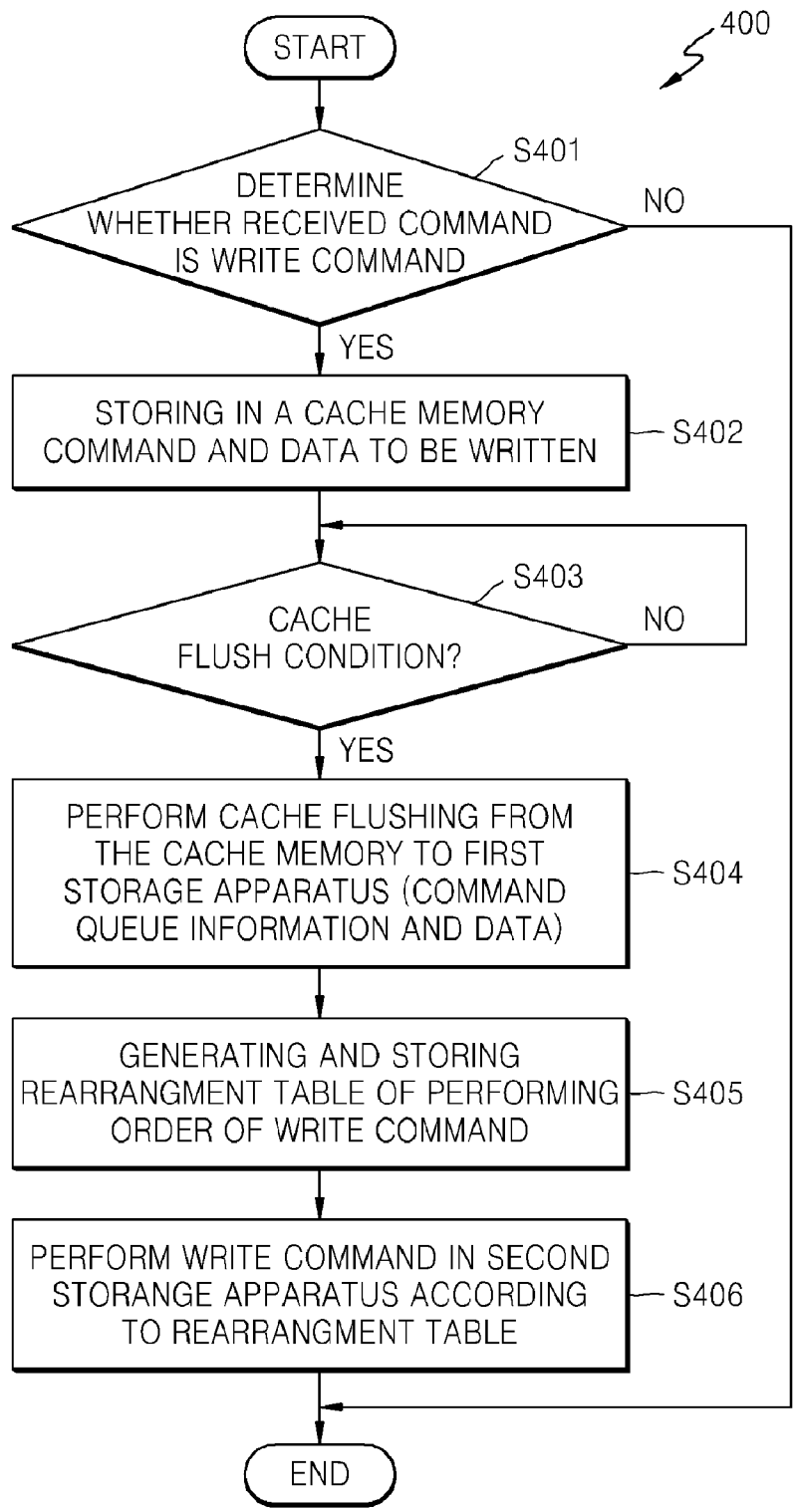
FIG. 4 illustrates a method of controlling cache flush according to an embodiment of the present general inventive concept.

Referring to FIGS. 1, 4, and 5, when a command is generated from the host apparatus 110 and is received in the controller 120, the CPU 120-1 of the controller 120 analyzes the command to determine whether the command is a write command or a read command at operation S401.

When the received command is determined to be a write command at operation S401, the command and data to be recorded (written) are stored in the cache memory 130 at operation S402. The cache memory 130 may include an area to store the command, such as command queue storage area 132, and an area to store data, such as data storage area 134. The command queue is stored in the command queue storage area 132, and the data to be recorded according to the write command is stored in the data storage area 134. The command queue is stored in command queue storage area 132 may have the commands of the command queue stored, for example, in the order that the commands were received.

The CPU 120-1 of the controller 120 determines whether a cache flush condition is generated or whether a cache flush condition is detected at operation S403. The cache flush condition may perform the cache flush when, for example, the data to be stored is greater than a total storing capacity of the cache memory 130.

The cache flush condition may also be performed when, for example, the data to be stored is greater than the presently available storage capacity of the cache memory 130. For example, the cache memory may have a total storing capacity, with at least a portion of it being present used to store data, and the remaining portion of the cache memory available to store additional data. The controller 120 may communicate with the cache memory 130 periodically to determine the presently available amount of memory for storage. Alternatively, the cache memory 130 may periodically provide, or provide when the data is either added or removed from the cache memory 130, the presently available amount of storage space to the controller 120. In other words, the cache flush may be performed when the controller 120 determines that the amount of data to be stored is greater than the presently available capacity of the cache memory 130.

Prior to performing a cache flush, the controller 120 may first determine the available capacity of the first storage apparatus 140 and/or the second storage apparatus to determine, upon performing a cache flush, whether the flushed data and/or commands should be stored in the first storage apparatus 140 or the second storage apparatus 150 based upon transmission availability (i.e., whether the storage apparatus is sending or receiving data) and/or available capacity for data storage (i.e., whether the presently available storage capacity may accommodate the flushed data and/or commands from the cache memory 130).

When the cache flush condition is generated and/or detected at operation S403, the CPU 120-1 performs the cache flush on the command queue stored in the command queue storage area 132 and the data stored in data storage area 134 in the storing medium 130-1 of the cache memory 130 in an auxiliary cache area assigned to the storing medium 140-1 of the first storage apparatus 140, as illustrated in a path (flow) 1 of FIG. 5, at operation S404. Here, the first storage apparatus 140 may be a non volatile memory apparatus having a writing speed higher than other storage apparatuses included in the data storage system. When the data storage system 100 includes two storage apparatuses as illustrated in FIG. 1 (e.g., the first storage apparatus 140, the second storage apparatus 150, etc.), the first storage apparatus 140 has a writing speed higher than the second storage apparatus 150. That is, the first storage apparatus 140 may be a non-volatile memory apparatus.

As illustrated at a path (flow) 2 of FIG. 5, the CPU 120-1 rearranges the commands of command queue 142 to form the rearrangement table of command performing order 146, and to perform a plurality of commands included in the command queues 142 and 146. The command queues 142 and 146 are cache flushed and stored in the first storage apparatus 140. The CPU 120-1 generates table information with the rearranged performing order (e.g., the rearrangement table of command performing order 146) for reducing a command performing time by considering a physical location on LBA information, and stores the table information in a specific storing medium 140-1 of the first storage apparatus 140 at operation S405. For example, an order of performing one or more write commands can be rearranged such that the order of write commands to increase the sequential writing of data to minimize seek time and latency.

For example, an order of performing write commands included in the command queue 142, information is rearranged to be in an order to sequentially perform the commands to sequentially store data in a direction from one portion to the other portion of the storing medium (e.g., when the storing medium is a hard disk storage device) or physically sequentially in the storing medium (e.g., when the storing medium is a semiconductor memory device), and the table information with the above described and rearranged command performing order is generated and stored.

As illustrated in paths (flows) 3 and 4 of FIG. 5, the CPU 120-1 performs the one or more write commands to store or write data in the data storing area 152 of the storing medium 150-1 of the second storage apparatus 150 according to the rearranged performing order of the table information, at operation S406. That is, according to the rearranged performing order of the table information 146, data stored in the first storage apparatus 140 is processed in an area of the storing medium 150-1 of the second storage apparatus 150.

With the above described operation, the first storage apparatus 140 having a faster speed than the second storage apparatus 150 may be used as an auxiliary cache memory to perform the cache flush process, thereby increasing a response speed on the cache flush. The table is generated to shorten the time taken to perform the plurality of write commands included in the command queue in the first storage apparatus 140. The writing speed can be increased when the write commands are performed using the rearranged table of command performing order 146.

According to the present general inventive concept, the hard disk drive may include a non-volatile semiconductor memory as an auxiliary cache memory.

Figure 10A:
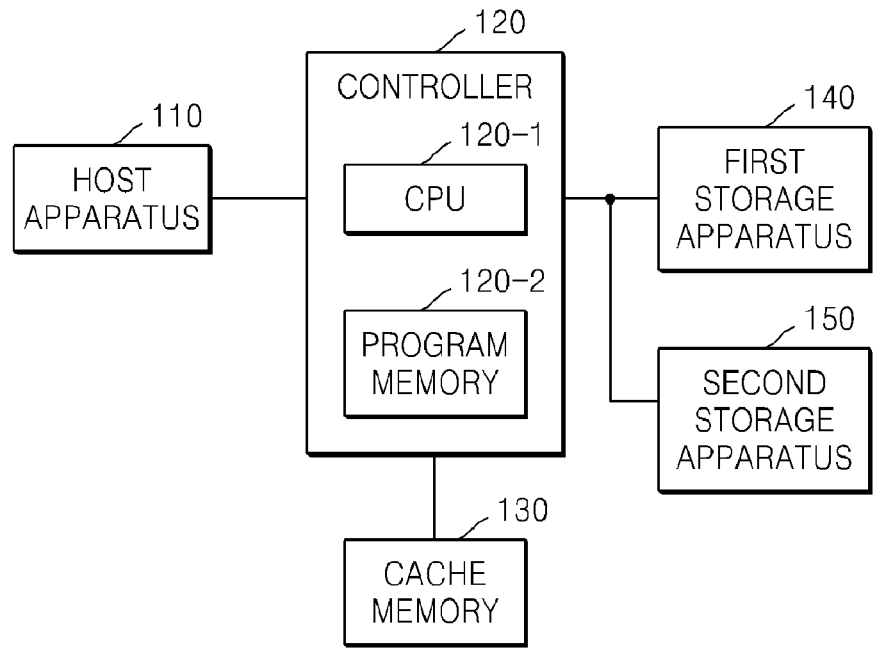
FIGS. 10A-10D illustrate different data storage system arrangements according to the embodiment of the present general inventive concept.
Figure 10B:
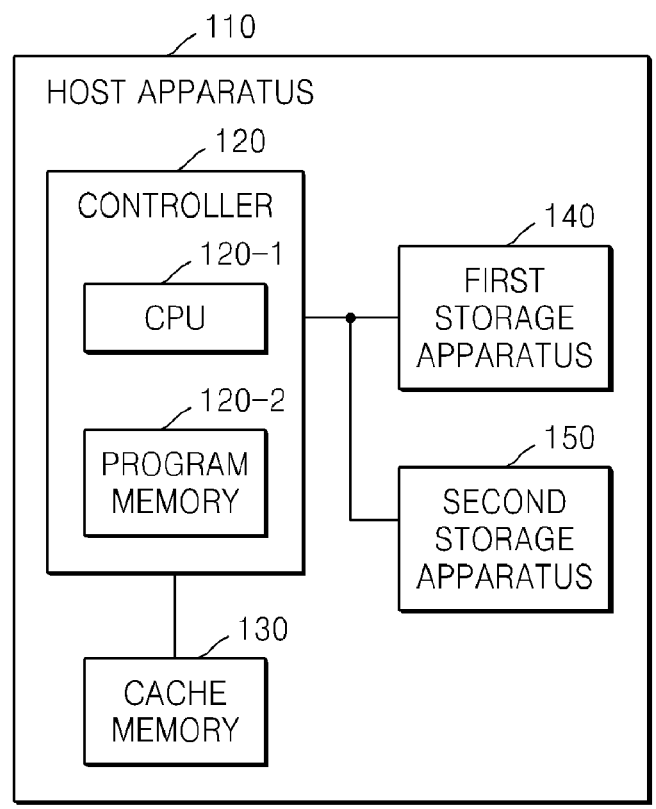
Figure 10C:
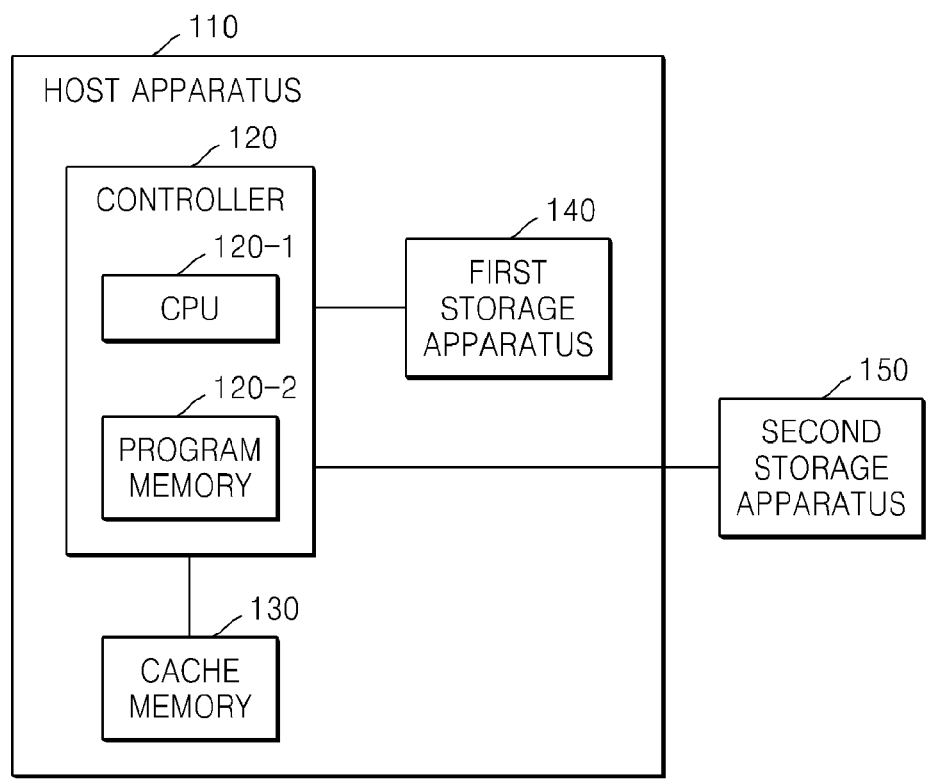
Figure 10D:
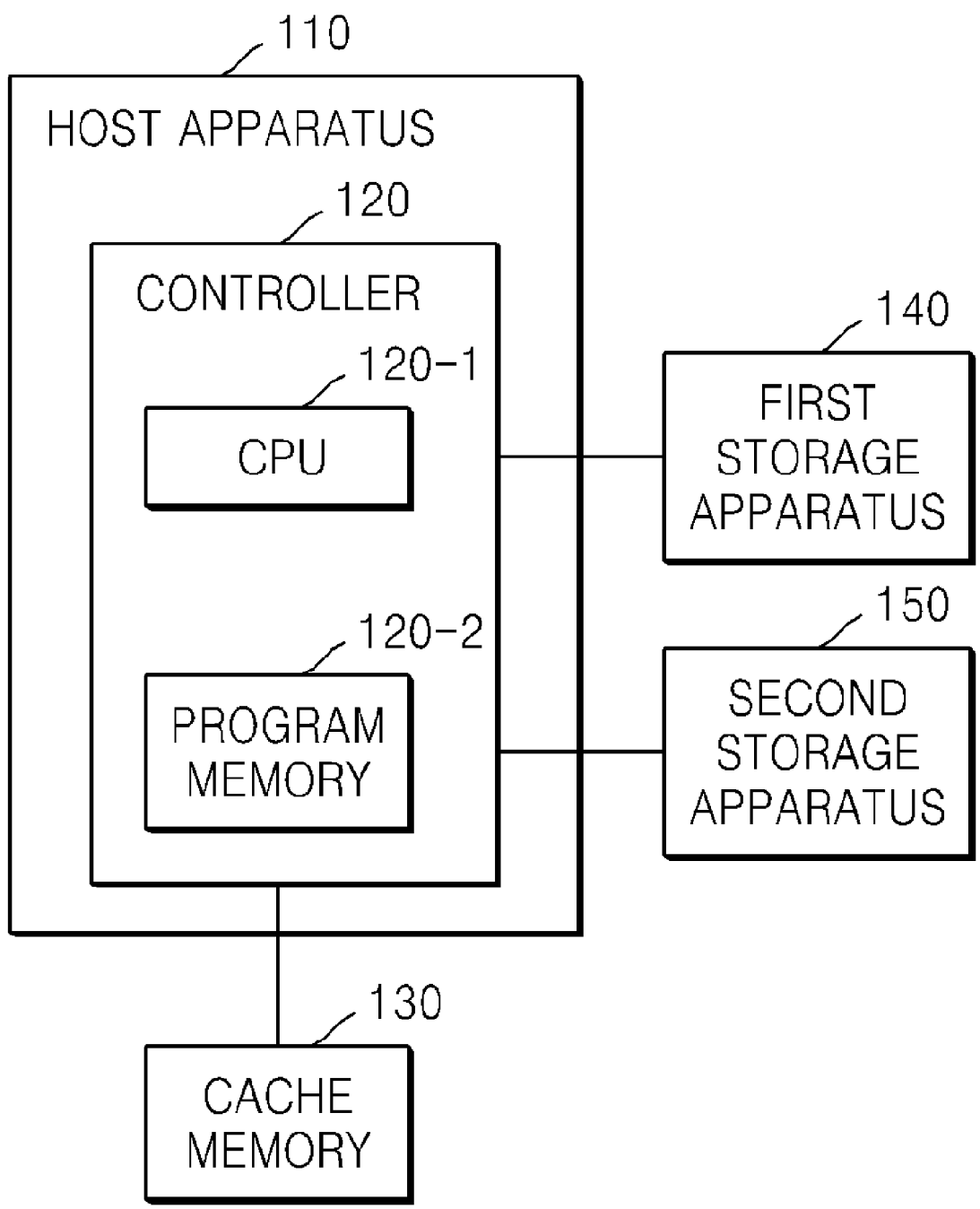

Turning to FIGS. 10A-10D, these figures illustrate different configurations of the host 110, the controller 120, the cache memory 130, the first storage apparatus 140, and the second storage apparatus 150. As illustrated in FIG. 10A, the first storage apparatus 140 and the second storage apparatus 150 may be separately coupled to communicate with controller 120. For example, the first storage apparatus 140 and the second storage apparatus 150 may be coupled to controller 120 with different interfaces, which have different data rates of communication. Turning to FIG. 10B, the host 110 may include the controller 120, the cache memory 130, the first storage apparatus 140, and the second storage apparatus 150. As illustrated in FIG. 10C, the host 110 may include controller 120 the cache memory 130, and the first storage apparatus 140, but the second storage apparatus 150 may be externally coupled to the host 110. Alternatively, the first storage apparatus 140 may be externally coupled to the host 110, and the second storage apparatus 150 may be a component of the host 110. Turning to FIG. 10D, the host 110 may include controller 120, and the cache memory 130, the first storage apparatus 140, and the second storage apparatus 150 may be externally coupled to the host 110. The cache memory 130, the first storage apparatus 140, and the second storage apparatus 150 may be coupled to the host 110 via using individual interfaces for each device, or using the same interface, or having at least two devices utilize the same interface with host 110.

The illustrated configurations in FIGS. 10A-10D may be exemplary configurations of the host 110, the controller 120, the cache memory 130, the first storage apparatus 140, and the second storage apparatus 150, and other suitable configurations of the host 110, the controller 120, the cache memory 130, the first storage apparatus 140, and the second storage apparatus 150 may be used to achieve the present general inventive concepts.

Figure 2:
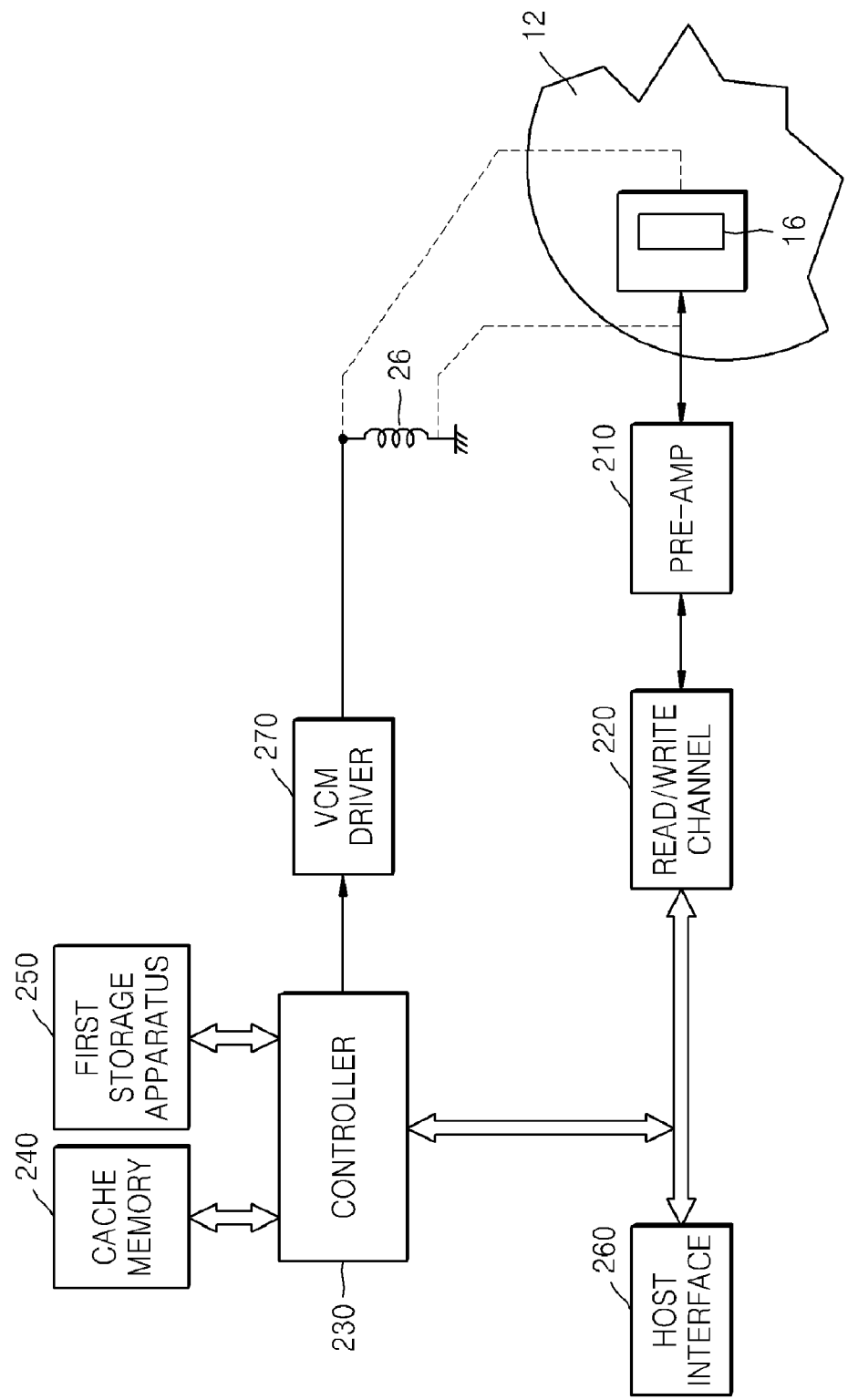
FIG. 2 illustrates a hard disk drive of the data storage system according to the embodiment of the present general inventive concept.

Referring now to FIG. 2, a hard disk drive includes a pre-Amp 210, a write/read channel 220, a controller 230, a cache memory 240, a first storage apparatus 250, a host interface 260, and voice coil motor (VCM) driver 270. The hard disk drive further includes a disk 12 as a data storage medium.

The first storage apparatus 250 may be a non-volatile storage apparatus or may be a memory apparatus having a writing speed faster than the writing speed of the disk 12. The first storage apparatus 250 may be a flash memory, a phase change Ram (PRAM), a ferroelectric RAM (FRAM), magnetic RAM (MRAM), etc. A portion of storing areas of the first storage apparatus 250 may be used as one or more storing areas of the auxiliary cache memory.

The controller 230 controls operations of the hard disk drive and may be implemented a digital signal processor (DSP), a microprocessor, a microcontroller, etc. The controller 230 controls the write/read channel 260 to read data from the disk 12 according to a command received from the host apparatus through the host interface 260 or to write data in the disk 12.

The controller 230 may be connected to the VCM drive 270 to supply driving current to the voice coil 26. The controller 230 supplies a control signal to the VCM drive 270 to control movement of the converter 16 and excitation of the voice coil 26.

The controller 230 may use the first storage apparatus 250 as an auxiliary cache apparatus to perform the cache flush and may perform a series of control processes to increase a write command performing speed.

Hereinafter, referring to FIGS. 7 and 8, exemplary read and write operation methods for a hard disk drive that may be used in connection with the present general inventive concept are explained.

Figure 7:
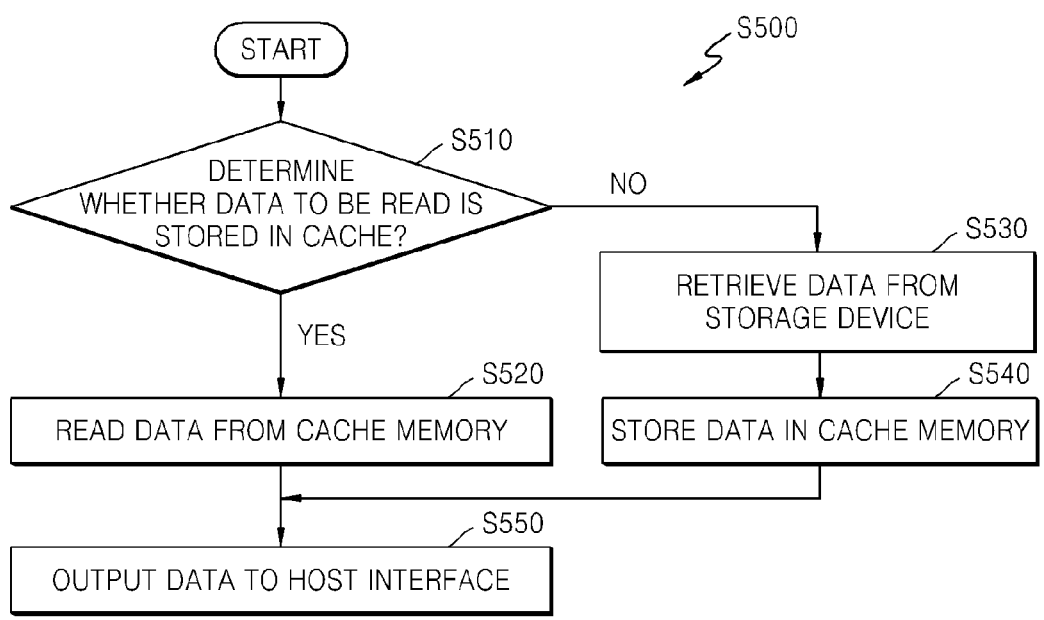
FIG. 7 illustrates a read operation of a hard disk drive of the data storage system of the embodiment of the present general inventive concept.

Turning to FIG. 7, in a data read mode operation S500, it is determined whether data to be read is stored in the cache memory at operation S510. If it is determined that the data is stored in the cache memory as operation S510, the data is read from the cache memory at operation S520 to output to the host interface 260 at operation S550. However, if it is determined at operation S510 that the data is not stored in the cache memory, the controller 230 of the hard disk drive controls the converter 16 to move a target location of the disk 12 to detect a signal from the disk. The signal is amplified by the pre-Amp 210 to be suitable for processing. The read/write channel circuit 230 performs a coding process on the signal according to sector pulses generated from the controller 230 to output a digital signal, and the digital signal is converted into stream data at operation S530. The stream data is temporarily stored in the cache memory at operation S540 and output to the host apparatus through the host interface 260 at operation S550.

Figure 8:
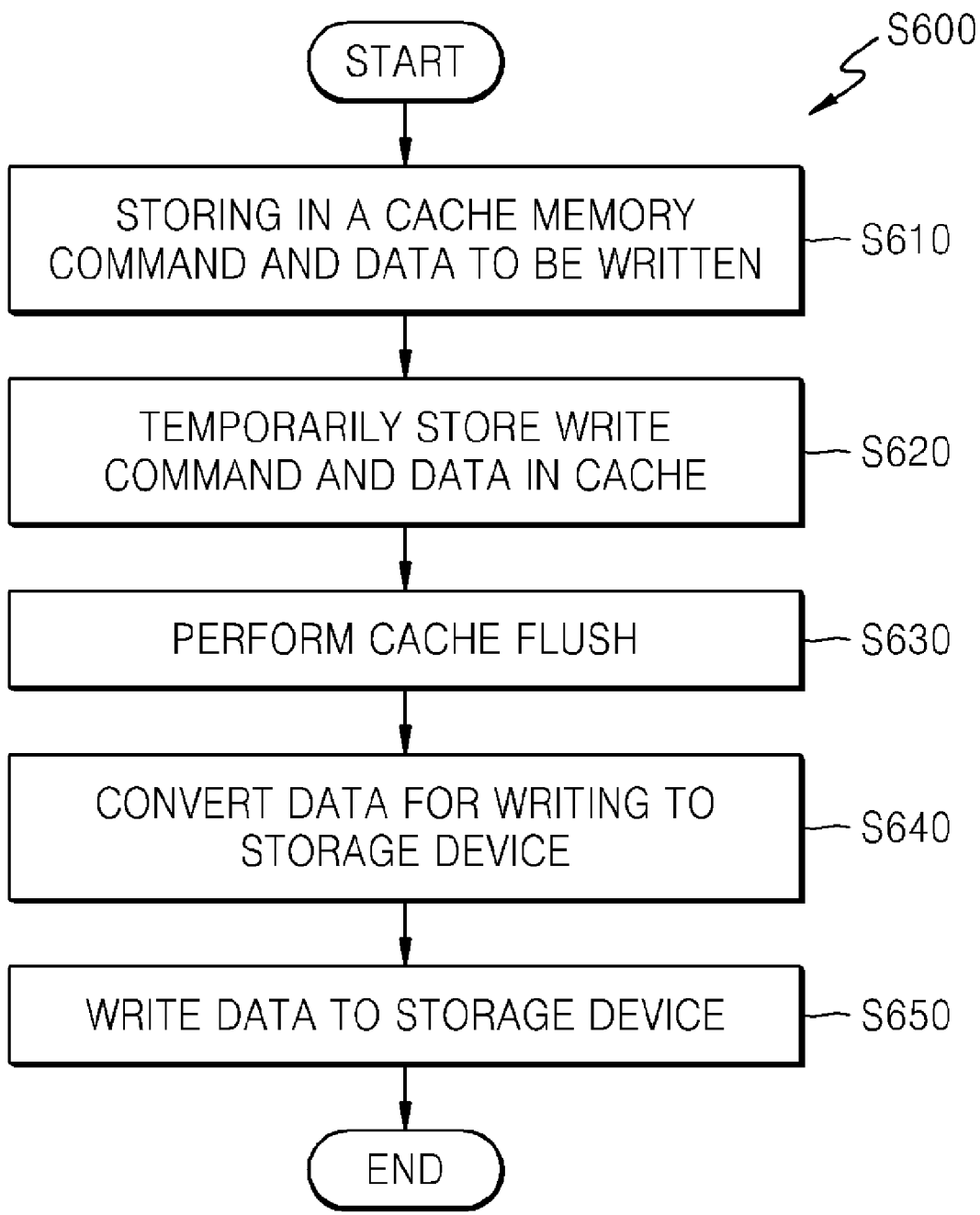
FIG. 8 illustrates a write operation of a hard disk drive of the data storage system of the embodiment of the present general inventive concept.

Turing to FIG. 8, in a data write mode operation S600, the hard disk drive receives from the host apparatus through the host interface 260 a write command and data to be recorded at operation S610, temporarily stores the receive write command and data in the cache memory 240 at operation S620, performs a cache flush at operation S630 on the write command and data using an auxiliary cache area of the first storage apparatus 250. The write/read channel circuit 220 converts the data output from the first storage apparatus 250 into binary data stream suitable form a writing channel of the disk 12 at operation S640, and the pre-amp 210 amplifies the binary data stream at a point where the sector pulses are generated, to be recorded or written on the disk using the converter 16 at operation S650.

A method of processing a cache flush operation and a write command performing operation according to the present general inventive concept, illustrated in FIG. 9 as S700, will be described hereinafter. The method may be performed according to the control of the controller 230.

When the write command and data to be recorded are received through the host interface 260 at operation S702, the controller 230 stores the command and data in the cache memory 240 at operation S704. The cache memory 240 is divided into an area to store the data and an area to store the command. The area where the command is stored at operation S704 stores a command queue, and the area where the data is stored at operation 706 stores the data to be recorded according to a write command. The command queue stores commands received in order.

The controller 230 determines whether a cache flush condition is generated at operation S708, and performs a cache flush operation to cache flush information on the command queue and the data in the auxiliary cache area of the first storage apparatus 250 at operation S710. The cache flush condition may be, for example, a condition set to perform the cache flush operation when data of which amount is greater than a total capacity of the cache memory or is greater than a storing ratio of the cache memory is stored in the cache memory.

The controller 230 generates a table having information on rearrangement of the commands to rearrange the performing order of the commands included in the command queue stored in the auxiliary cache area of the first storage apparatus 250 at operation S712 by considering physical locations of the LBAs so as to reduce a period of time taken to perform the commands (or the write commands). The period of time can be set to a shortest period of time in performing the plurality of commands. The period of time may include a seek time and a latency time. Considering at least one of the seek time and the latency time, the order of performing the commands is changed or adjusted at operation S714, such that the commands are rearranged to complete performing all the commands in a reference period of time, or are rearranged to complete performing the commands in a shortest period of time. For example, the performing order of the plurality of write commands included in the command queue is arranged in a direction from a side of the disk to another side of the disk 12, thereby sequentially performing the commands in the direction, and generating a table with information on the rearrangement of the performing order of the commands. That is, upon receiving one or more write commands, LBA information to start recording of the data is converted into a cylinder head sector CHS information to generate the table to rearrange the performing order of the write commands included in the command queue considering physical locations of the LBAs with respect to the disk 12 so as to shorten the seek time and the latency time. The controller 230 stores the table in a designated storing area of the first storage apparatus 250 at operation S716.

Figure 6:
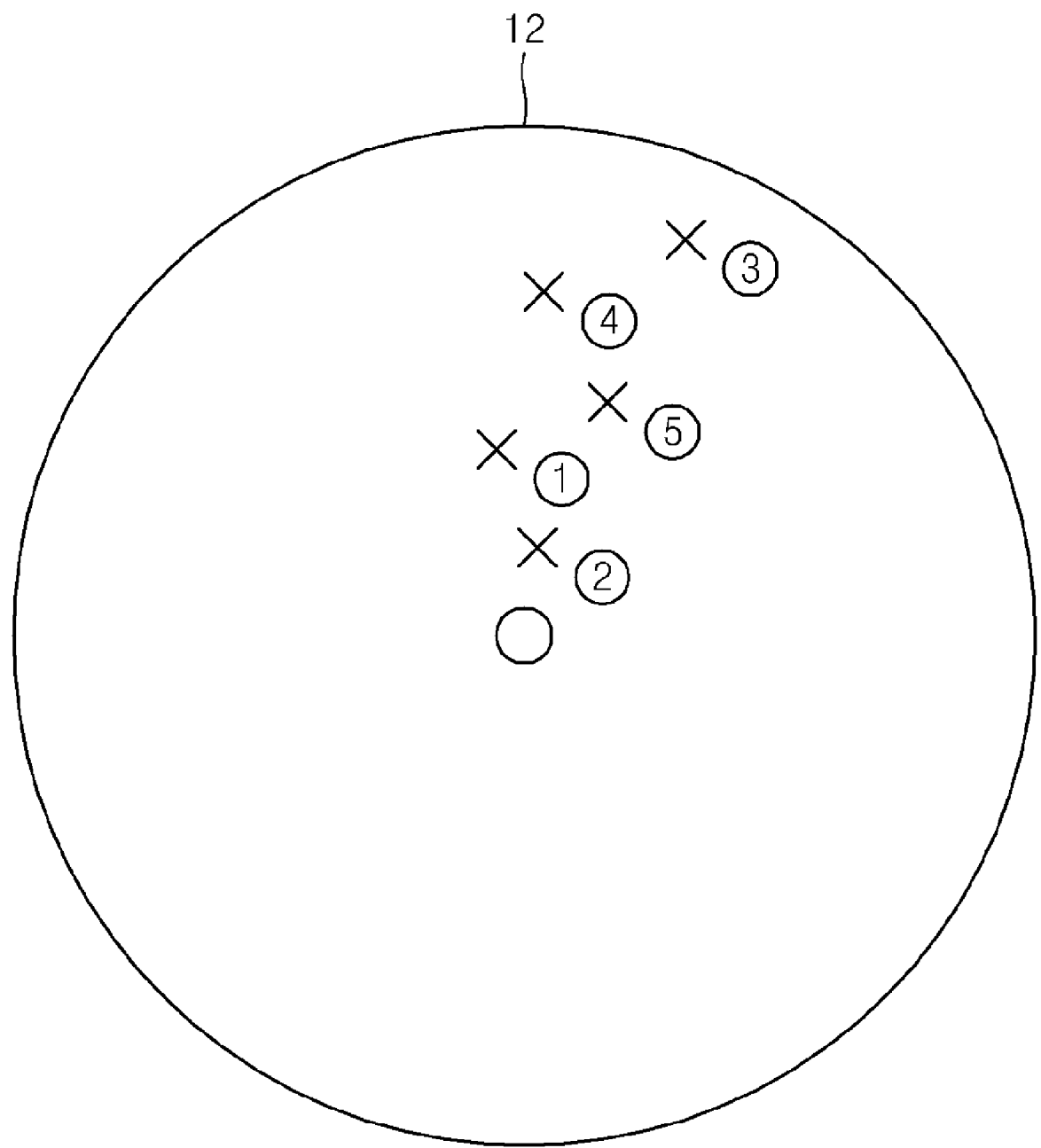
FIG. 6 illustrates a rearranged order of write commands such that the write commands can be performed from an inside to an outside of a hard disk according to an embodiment of the present general inventive concept.

As illustrated in FIG. 6, if the performing order of the write commands included in the command queue is 1-2-3-4-5 in order with respect to physical locations of the disk 12, the performing order of the write commands can be rearranged such that the write commands can be performed from an inside to an outside of the disk. In this case, the table may include the information on the performing order of the write commands such that the performing order of the writing commands can be 2-1-5-4-3 in order with respect to the physical locations of the disk 12.

It is possible that the performing order may be from an outside to an inside of the disk 12 in a direction, for example, a radial direction of the disk 12. In this case, the performing order is rearranged such that the performing order of the write commands is 3-4-5-1-2- in order with respect to the physical locations of the disk 12.

The controller 230 performs the write commands according to the rearranged performing order of the table stored in the first storage apparatus 250 at operation S718. Therefore, data output from the first storage apparatus 250 is stored, recorded, or written on the disk through the write/read channel 220 and the pre-Amp 210.

Figure 3:
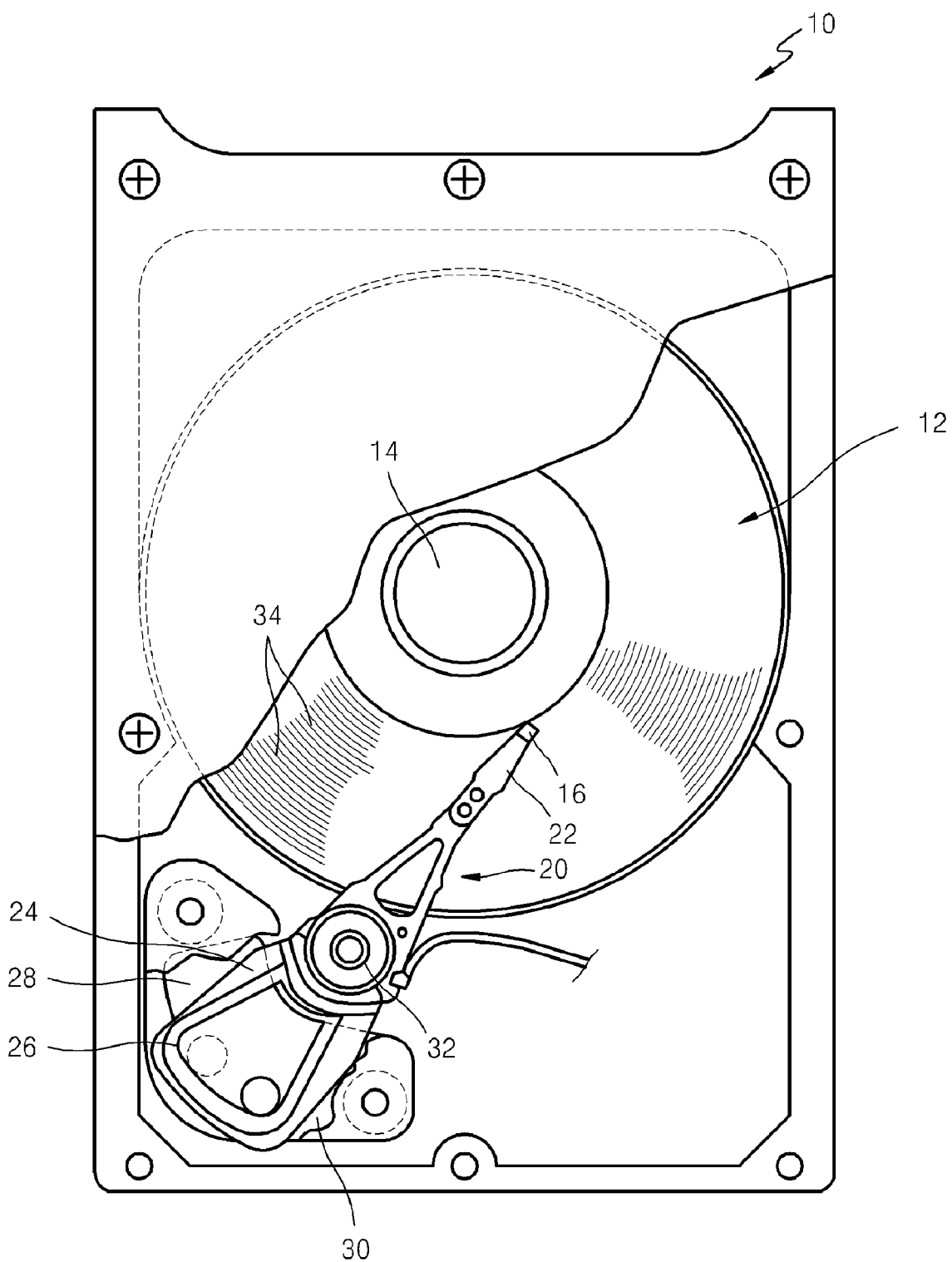
FIG. 3 illustrates a head disk assembly of the hard disk drive in the data storage system according to the present general inventive concept.

FIG. 3 illustrates a head disk assembly (HDA) 10 of the hard disk drive that may be used in a data storage system 100 according to an embodiment of the present general inventive concept.

The HDA 10 includes at least one disk 12 rotatable by a spindle motor 14. The disk 12 may be a magnetic disk. The HDA 10 may also include a converter 16 disposed adjacent to a surface of the disk 12.

The converter 16 writes or read data on or from the disk 12 by magnetizing the disk or detecting a magnetic field. The converter 16 may be a single converter. However, the converter 16 may be a plurality of converters as a converter to magnetize the disk for writing and a converter to detect a magnetic field for reading. The converter 16 may be a magneto-resistive element. The converter 16 may be referred to as a head.

The converter 16 may be combined with a slider 20. The slider 20 may have a structure to generate an air bearing between converter 16 and the disk 12. The slider is combined with a head gimbal assembly 22. The head gimbal assembly 22 may be mounted on the actuator arm 24 with a voice coil 26. The voice coil 26 is disposed adjacent to the magnetic assembly 28 to correspond to a voice coil motor VCM 30. Current supplied to the voice coil 26 is used to generate a torque to rotate the actuator arm 24 with respect to the bearing assembly 32. The actuator arm 24 rotates to control the converter 16 to move with respect to the disk 12 or to traverse tracks of the disk.

Information or data is stored or written on tracks 34 of the disk 12. The tracks 34 may be an eccentric track. Each track 34 includes a plurality of sectors. Each sector includes a data field and an identification field. The identification field includes one or more Gray codes to identify sector and track (cylinder). One or more storing areas (access areas) of the disk 12 are assigned with LBA information. The LBA information is converter into cylinder/head/sector information to designate the storing area of the disk 12. The converter 16 moves cross the surface of the disk 12 to write or read data from different tracks 34.

Figure 11:
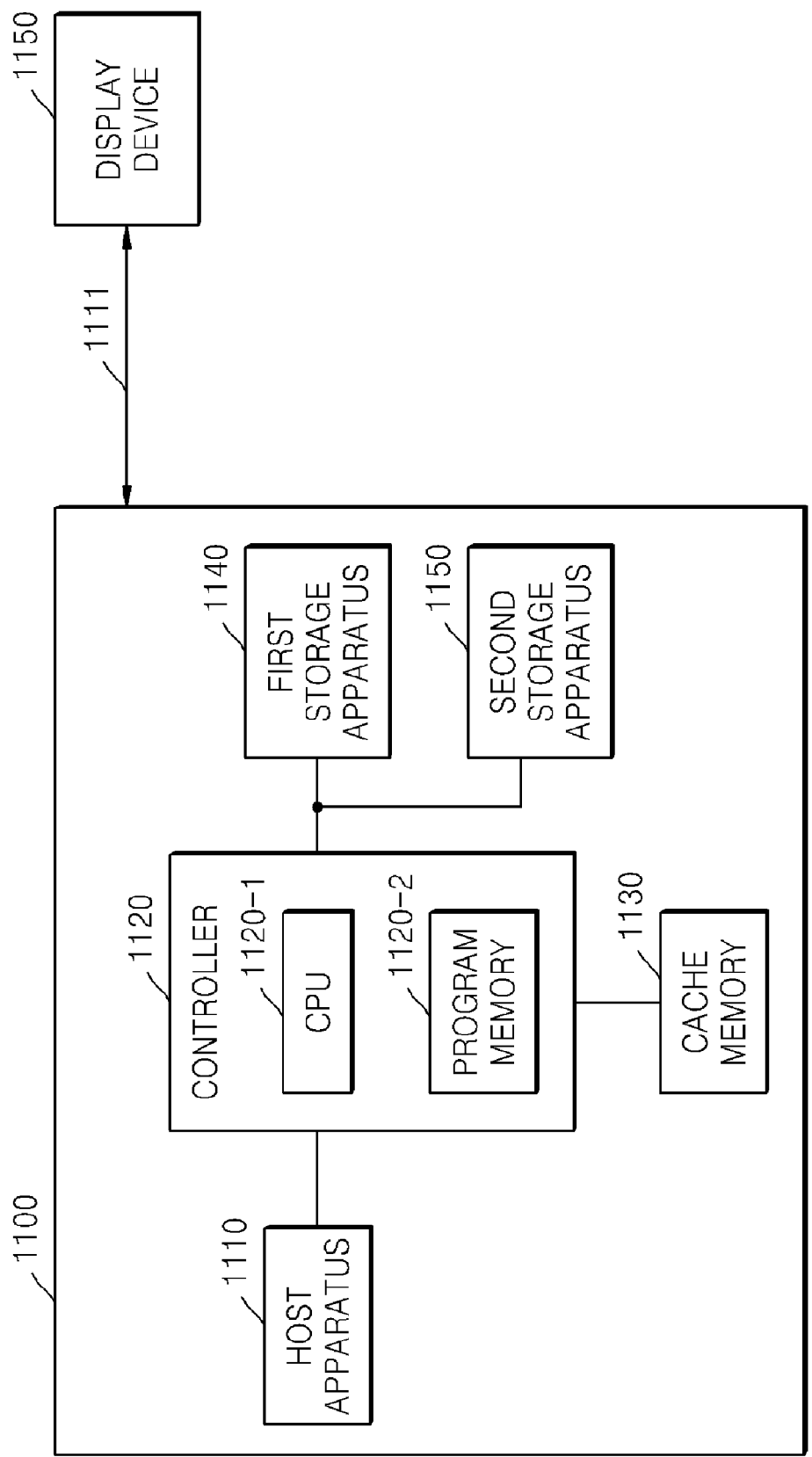
FIG. 11 illustrates a data storage system coupled to a display device via a communications transmission medium to display cache flush and data location operations according to the embodiment of the present general inventive concept.

FIG. 11 illustrates a data storage system 1100 including a host 1110, a controller 1120, a central processing unit (CPU) 1120-1, a program memory 1120-2, a cache memory 1130, a first storage apparatus 1140, and a second storage apparatus 1150, which may be similar to the host 110, the controller 120, the CPU 120-1, the program memory 120-2, the cache memory 130, the first storage apparatus 140, and the second storage apparatus 150, respectively, as illustrated in FIG. 1 and described above. The data storage system 1100 may be communicatively coupled via a transmission medium 1111 to a display device 1500. Transmission medium may be any suitable wired or wireless communication medium to transmit commands and/or data to between the data storage system 1100.

Figure 9:
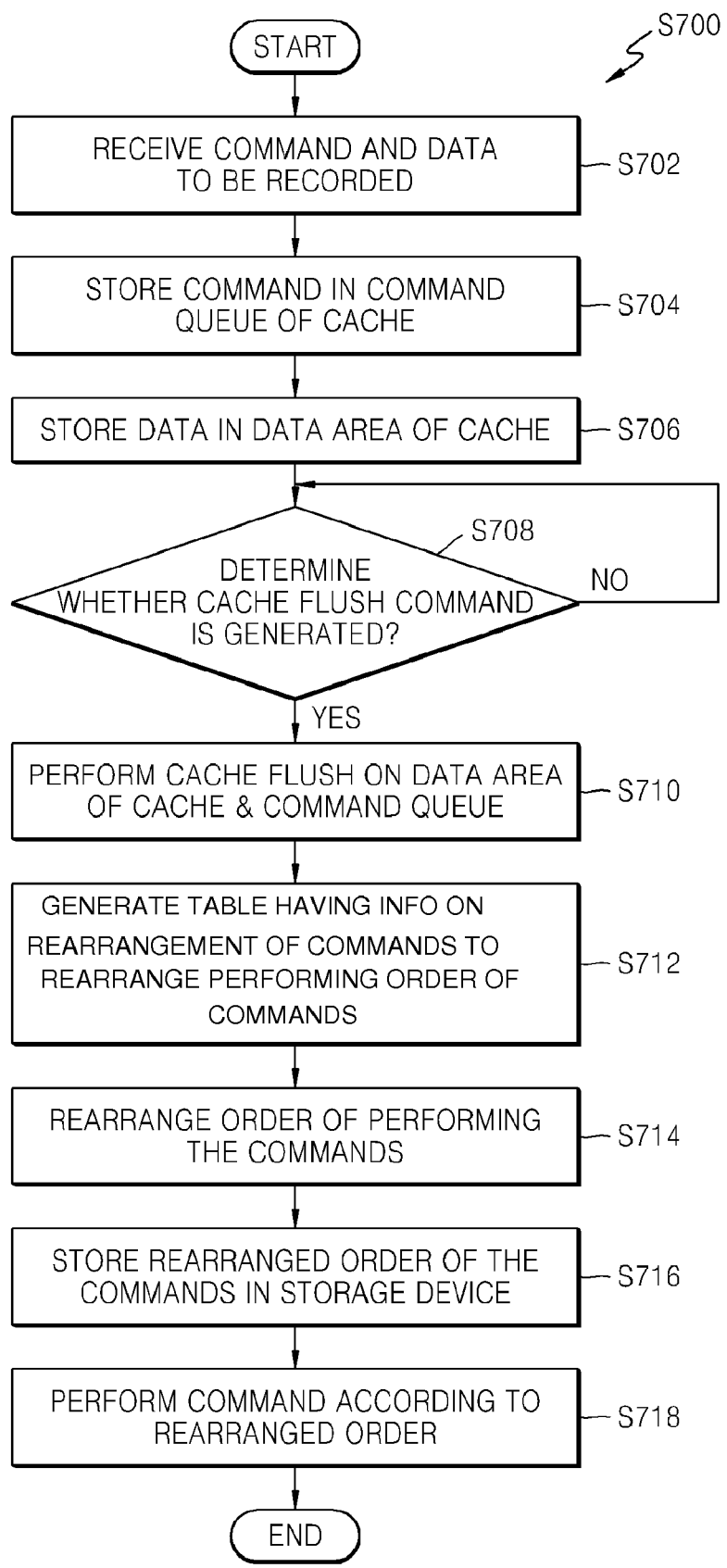
FIG. 9 illustrates a method of processing a cache flush operation and a write command performing operation according to an embodiment of the present general inventive concept.

The data storage system 1100 may also transmit a signal via transmission medium 1111 to the display device 1500 for display to indicate for example, a change in location of data or a cache flush condition, and/or any other operation illustrated in FIGS. 7-9 to a user or maintenance operator may view. The data storage system may transmit a signal via transmission medium 1111 as a menu or a user interface to the display device 1500 for display indicating that data has been read from the cache memory 1130 (e.g., at S520 of FIG. 7), data has been retrieved from a storage device (e.g., and stored in cache memory (e.g., S530 and S540 of FIG. 7), and/or that data has been output to host interface (e.g., S550 of FIG. 7). The data storage system 1100 may also transmit a signal via transmission medium 1111 to the display device 1500 for display to indicate, for example, that a write command and data to be recorded have been received by the controller 1120 from the host 1110 (e.g., S610 of FIG. 8), that the write command and data have been temporarily been stored in the cache memory 1130 (e.g., S620 of FIG. 8), that a cache flush (e.g., S630 of FIG. 8) has been performed on the cache memory 1130, and/or that the data has been converted and written to (e.g., S640 and S650 of FIG. 8) the first storage apparatus 1140 or the second storage apparatus 1150. In yet another example, the data storage system 1100 may also transmit a signal via transmission medium 1111 to the display device 1500 for display to indicate any of the operations (e.g., S702-S718) illustrated in FIG. 9 and described above.

The present general inventive concept can be implemented a method, an apparatus, and a system. The present general inventive concept can be implemented a program as code segments to perform operations necessary to respective elements of the present general inventive concept. The present general inventive concept can be implemented a computer-readable medium. The computer-readable medium may be a computer-readable recording medium or a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method comprising:
   cache flushing information stored in a cache memory to a first storage apparatus of a plurality of storage apparatuses included in a data storage system when a cache flush condition is generated; and
   generating a table to represent rearrangement of an order of a plurality of commands included in a command queue of the information such that order to perform the commands of the command queue is rearranged according to physical location of logical block addresses.

2. The method of claim 1, wherein the plurality of storage apparatuses comprise a non-volatile storage apparatus.

3. The method of claim 1, wherein the first storage apparatus comprises a non-volatile storage apparatus having a writing speed higher than other storage apparatuses included in the data storage system.

4. The method of claim 1, wherein the information comprises a command queue and data to be recorded.

5. The method of claim 1, further comprising:
   performing a write command in a second storage apparatus of the plurality of storage apparatuses which has a write speed lower than the first storage apparatus according to information stored in the first storage apparatus processed with the cache flush.

6. The method of claim 5, wherein the rearranged order of the commands included in the command queue to be performed is corresponds to a direction in which the commands are sequentially performed on a storage medium in the direction.

7. The method of claim 5, wherein the table is stored in the first storage apparatus.

8. A non-transitory computer-readable medium to contain computer-readable codes, that, when executed by a computer, perform a cache flush control method of a data storage system, the method comprising:
cache flushing information stored in a cache memory to a first storage apparatus of a plurality of storage apparatuses included in a data storage system when a cache flush condition is generated; and
generating a table to represent rearrangement of an order of a plurality of commands included in a command queue of the information such that order to perform the commands of the command queue is rearranged according to physical location of logical block addresses.

9. A data storage system comprising:
a plurality of storage apparatuses having different data writing methods;
a cache memory to temporarily store information read from or to be stored in the plurality of storage apparatuses; and
a controller to generate a table to represent rearrangement of an order of a plurality of commands included in a command queue of the information stored in a cache memory to a first storage apparatus of a plurality of storage apparatuses of a data storage system such that the order to perform the commands of the command queue is rearranged according to physical location of logical block addresses so as to shorten a period of time taken to perform the commands in a second storage apparatus of the plurality of storage apparatuses.

10. The system of claim 9, wherein the plurality of storage apparatuses comprise a non-volatile storage apparatus.

11. The system of claim 9, wherein the first storage apparatus comprises a non-volatile storage apparatus having a writing speed higher than other storage apparatuses included in the data storage system.

12. The system of claim 9, wherein the controller cache flushes information stored in the cache memory to the first storage apparatus of the plurality of storage apparatuses included in the data storage system when a cache flush condition is generated, and performs a write command in the second storage apparatus of the plurality of storage apparatuses which has a write speed lower than the first storage apparatus according to information stored in the first storage apparatus processed with the cache flush.

13. The system of claim 12, wherein the controller stores information on the table in the first storage apparatus.

14. The system of claim 13, wherein the controller performs a write command in a second storage apparatus by reading data stored in the first storage apparatus according to the rearranged order of the commands in the generated table.

15. The system of claim 12, wherein the rearranged order of the commands included in the command queue to be performed corresponds to a direction in which the commands are sequentially performed on a storage medium in the direction.

16. The system of claim 15, wherein the storage medium comprises a disk.

17. A device comprising:
a controller configured generate a table to represent rearrangement of an order of a plurality of commands included in a command queue of information stored in a cache memory to a first storage apparatus of a plurality of storage apparatuses of a data storage system such that an order to perform the commands of the command queue is rearranged according to physical location of logical block addresses so as to shorten a period of time taken to perform the commands in a second storage apparatus of the plurality of storage apparatuses.

18. The device of claim 17, further comprising performing a write command in a second storage apparatus of the plurality of storage apparatuses which has a write speed lower than the first storage apparatus according to information stored in the first storage apparatus processed with a cache flush.

19. A method comprising:
generating a table to represent a rearrangement of a plurality of commands included in a command queue of information stored in a cache memory to a first storage apparatus of a plurality of storage apparatuses of a data storage system such that an order to perform the plurality of commands is rearranged according to physical location of logical block addresses; and
performing write commands on a second storage apparatus by reading data from the first storage apparatus according to the table.

20. The method of claim 5, further comprising performing the write command in the second storage apparatus by reading data from the first storage apparatus according to the table.

* * * * *